Jan. 17, 1928.
A. MOORE
1,656,360
ANTIDETONATION PISTON CONSTRUCTION FOR INTERNAL COMBUSTION ENGINES
Filed Jan. 17, 1927
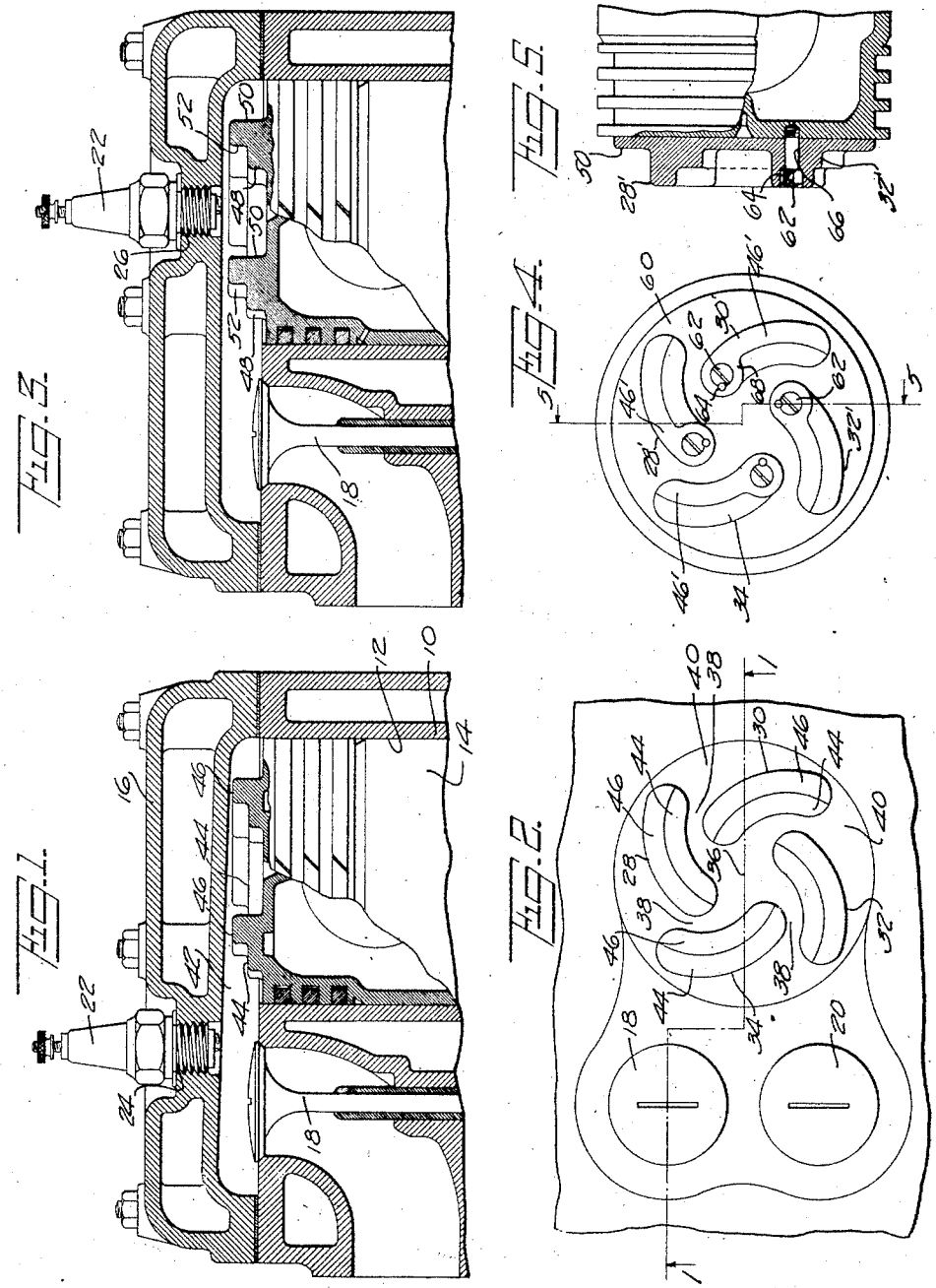
INVENTOR
Arlington Moore
BY
H. H. Dyke
ATTORNEY Patented Jan. 17, 1928.

1,656,360

UNITED STATES PATENT OFFICE.

ARLINGTON MOORE, OF NEW YORK, N. Y., ASSIGNOR, BY MESNE ASSIGNMENTS, TO MAXMOOR CORPORATION, OF NEW YORK, N. Y., A CORPORATION OF DELAWARE.

ANTIDETONATION PISTON CONSTRUCTION FOR INTERNAL-COMBUSTION ENGINES.

Application filed January 17, 1927. Serial No. 161,525.

My invention is of an anti-detonation piston head for internal combustion engines.

The object of the invention is the provision of the piston head of an internal combustion engine with projections forming substantially turbine-like passages between them, whereby the movement of the gases and flame propagation is controlled and directed in such a way as to materially reduce or entirely avoid detonation as an accompaniment of combustion in the engine cylinders.

Another object consists in the provision of a separate crown for attachment to the piston heads and containing projections and passages by which detonation is avoided.

With these and related objects in view, I show in the accompanying drawings an embodiment of my invention which is intended for illustration and for affording an understanding of the principle of the invention.

In said drawings, Fig. 1 is a fragmentary vertical section of an L-head internal combustion engine adapted to consume volatile liquid fuel and equipped with a piston embodying my invention, the section being taken on line 1—1, Fig. 2. Fig. 2 is a plan view with the cylinder head removed. Fig. 3 is a view similar to Fig. 1, but with the spark plug over the piston, instead of over the intake valve as in Fig. 1. Fig. 4 is a plan view of a piston head having a separate crown attached thereto, and Fig. 5 is a section on line 5—5, Fig. 4.

Reference character 10 designates the cylinder block, 12 the cylinder bore, 14 the piston, and 16 the cylinder head of a four cycle internal combustion engine adapted to consume volatile liquid fuel. The engine shown is an L-head engine having side valves, the intake valve being designated by reference character 18 and the exhaust valve by reference character 20. Cylinder head 16 is preferably removable as shown. The spark plug 22 may be located in a hole 24 over the intake valve 18 (Fig. 1), but is preferably located in hole 26 over the piston head, and preferably over the center of the piston head. (Fig. 3).

The piston head is so formed that upward extensions therefrom alternate with intermediate open spaces, providing in effect, and especially when the piston is at top center, spirally radiating passages between the extending or projecting portions, said passages merging in an open space at the center of the piston head.

In the form shown, there are four of the upward extensions 28, 30, 32 and 34, of outline comprising arcuate sides and rounded ends, each arranged with its inner end at a short distance from the center of the head of piston 14, thence extending outwardly in substantially spiral or circumferential direction, and the outer rounded ends terminating near the periphery of the piston head 14. This spacing and substantially radiating arrangement of the projections 28—34 produces an open central space 36, from which radiate the substantially turbine passages 38, opening into the broad spaces 40 between the outer ends of the projections.

The projections are preferably formed with stepped surfaces, each thereof in the form shown being provided with two steps. In the case of the projections 28 and 30 located furthest from the valve end of combustion chamber 42, the lower step 44 is located on the inner side of said projections 28 and 30 or nearer the central space 36, and the higher step 46 on the outer side thereof. In the case of the other two projections 32 and 34, located on the side of the piston head nearer the valves, the lower step 44 is formed on the outer, and the upper step 46 on the inner, side of the projections. The side walls 48 and 50 of projections 28—34, and the riser wall 52 connecting the steps 44 and 46 are preferably at substantially right angles to the plane of the piston head surface, and the step surfaces 44, 46 are preferably plane surfaces substantially parallel to the piston head.

Thus the passages 38 between the several projections are narrowest next to or close down upon the piston head, and further away from the piston head, they are widened out by the width of step surfaces 44.

Instead of being formed directly in the material of the piston head, projections 28', 30', 32' and 34' may be formed on a crown 60 having its under surface fitting the piston head closely so as to secure good heat conduction, and secured in place, as by the screws 62. The screws 62 are preferably locked in place by drilling holes partly in the screw and partly in the crown member 60, after the screws have been screwed up tight, and driving dowel pins 64 into these holes and then peening over the material to substantially bury the heads of the dowel pins. When the screw holes 66 are drilled through the part of crown 60 containing the projections as 28′, and at their inner ends of such projections as shown, the upper step surfaces 46′ are widened out in such region to form substantially a rounded boss 68, thus furnishing plenty of material to secure an effective fastening. The provision of the separately attached crown is especially useful in converting old engines to embody my invention and where it is desired to increase the compression ratio by reducing the clearance volume. The crowns may be of the same metallic composition as the pistons, in which case their having the same coefficients of expansion is of advantage, or other metals, preferably good conductors of heat, may be used for making the crowns.

The described piston head formation is of value in securing agitation of the cylinder gases and improved admixture thereof during the intake and compression strokes and avoiding tendency of the unscavanged gases to be disposed in separate layer formation, but the greatest benefit of the invention is manifested during combustion and on the expansion stroke. With the spark plug arranged over the central space 36, the flame propagation is largely directed along the passages 38, and out through the enlargements 40 thereof and with the progressive expansion of the hot gases so obtained, and the breaking up of pressure waves produced by the projections and the step and riser surfaces thereof, and the rapid spread of the flame produced by the agitated state of the gases, detonation is effectually avoided. Furthermore, the projections being heated during combustion give up heat to the incoming charge and produce improved results in the direction of securing complete gasification of the liquid fuel in case of wet mixture being supplied to the engine cylinders. The agitation and heat transfer obtained during the intake stroke and upon compression are of advantage in avoiding localized overheating and preignition.

With the spark plug over the intake valve, the results secured are generally similar, and while there is not quite the same turbine or radiating effect in the spreading of flame immediately upon ignition as is secured with the spark plug over the center of the piston, the advance of any pressure wave progressing toward the end of the combustion chamber opposite the valves is effectually broken up by coming into repeated contact with the step and riser surfaces of the projections which are encountered in turn one after another.

The subject matter of my invention disclosed in this application and not claimed therein is disclosed and claimed in part in my copending application serial No. 145,211, filed October 30, 1926 and in part in one or more of the following copending applications filed by me: Serial No. 125,414, filed July 28, 1926; Serial No. 140,726, filed Oct. 11, 1926; Serial No. 140,727, filed Oct. 11, 1926; Serial No. 141,289, filed Oct. 13, 1926; Serial No. 142,230, filed Oct. 18, 1926; Serial No. 142,231, filed Oct. 18, 1926; Serial No. 143,317, filed Oct. 22, 1926; Serial No. 145,212, filed Oct. 30, 1926.

I claim:

1. A piston for four-cycle internal combustion engines consuming volatile liquid fuel, having projections on its head disposed in spaced relation to each other about a common center and extending outwardly in a circumferential direction relative to said center.

2. A piston for four-cycle internal combustion engines consuming volatile liquid fuel, having projections on its head disposed in angular relation to each other about a common center and extending outwardly in a circumferential direction relative to said center, said projections having stepped surfaces.

3. An L-head, four-cycle internal combustion engine for consuming volatile liquid fuel, having the pistons thereof provided with head projections disposed in angular relation to each other, and extending outwardly in a circumferential direction relative to the center of the piston, and the spark plug being located over the piston head.

4. An L-head, four-cycle internal combustion engine for consuming volatile liquid fuel, having the pistons thereof provided with head projections disposed in spaced relation to each other about the center of the piston and extending outwardly therefrom, and alternating with intermediate open passages of width increasing outwardly towards the outer portions of the piston head, and the spark plug being located over the piston head.

5. A crown for attachment to piston heads of four-cycle internal combustion engines consuming volatile liquid fuel, having projections thereon disposed in spaced relation to each other about a central point, and extending outwardly in a circumferential direction relative to said point.

6. A piston for four-cycle internal combustion engines comprising a plurality of members projecting from the piston head and disposed in angular relation to each other about the center thereof, and providing outwardly extending passages therebetween; each of said members including stepped portions, and the members at one side of said piston head having the lower of said stepped portions facing outwardly, and the members at the opposite side of said piston head having the lower of said stepped portions facing inwardly.

7. A piston for four-cycle internal combustion engines comprising a plurality of arcurate members projecting from the piston head and disposed in angular relation to each other about the center of said piston head; said members extending outwardly in a spiral direction relative to said center and providing therebetween a plurality of passages having wide inner portions, relatively constricted intermediate portions, and relatively wide outer portions.

8. A four-cycle internal combustion engine comprising a cylinder having a combustion chamber at one end thereof, a piston head within said cylinder, a plurality of members projecting from said piston head and disposed in spaced relation to each other about the center thereof; said members extending outwardly in a circumferential direction relative to said center, and providing outwardly extending passages therebetween, and a spark plug within said combustion chamber in alignment with the center of said piston head.

9. A four-cycle internal combustion engine comprising a cylinder having a combustion chamber at one end thereof, a piston head within said cylinder, a plurality of arcuate members each having stepped portions and projecting from said piston head and disposed in angular relation to each other about the center thereof; said arcuate members extending outwardly in a spiral direction relative to said center and providing a plurality of passages therebetween, each having a wide inner portion, a relatively constricted intermediate portion and a relatively wide outer portion, and a spark plug disposed within said combustion chamber in alignment with the center of said piston head.

In testimony whereof, I have signed my name hereto.

ARLINGTON MOORE.